United States Patent [19]
Seefeldt et al.

[11] Patent Number: 5,574,361
[45] Date of Patent: Nov. 12, 1996

[54] SWITCHED RELUCTANCE ANGULAR VELOCITY SENSOR

[75] Inventors: James D. Seefeldt, DeForest; Timothy C. Ausavich; Jeffrey J. Bloom, both of Janesville, all of Wis.

[73] Assignee: SSI Technologies, Inc., Janesville, Wis.

[21] Appl. No.: 364,598

[22] Filed: Dec. 27, 1994

[51] Int. Cl.$^6$ ............................................. G01P 3/488
[52] U.S. Cl. ................................. 324/174; 384/448
[58] Field of Search ............................ 324/173, 174, 324/207.15, 207.25; 384/448; 310/168; 340/441, 671

[56] References Cited

U.S. PATENT DOCUMENTS

| | | | |
|---|---|---|---|
| 3,739,211 | 10/1971 | Hasler | 310/168 |
| 4,864,231 | 5/1988 | Okumura et al. | 324/173 |
| 4,986,605 | 5/1989 | Descombes | 301/105 R |
| 5,004,358 | 4/1991 | Varvello et al. | 384/446 |
| 5,004,980 | 4/1991 | Ida et al. | 324/166 |
| 5,011,303 | 4/1991 | Caron | 384/448 |
| 5,017,868 | 5/1991 | Hajzler | 324/207.22 |
| 5,023,546 | 6/1991 | Pawlak et al. | 324/174 |
| 5,023,547 | 6/1991 | Pawlak et al. | 324/174 |
| 5,026,178 | 6/1991 | Ballhaus | 384/448 |
| 5,046,867 | 9/1991 | Hilgy et al. | 384/448 |
| 5,080,500 | 1/1992 | Hilby et al. | 384/448 |
| 5,090,236 | 2/1992 | Vignotto | 73/118.1 |
| 5,111,098 | 5/1992 | Peck et al. | 310/268 |
| 5,125,845 | 6/1992 | Benktander et al. | 439/16 |
| 5,130,650 | 7/1992 | Lemarquand | 324/207.22 |
| 5,131,763 | 7/1992 | Caron | 384/448 |
| 5,132,616 | 7/1992 | Vignotto | 324/174 |
| 5,145,379 | 9/1992 | Benktander et al. | 439/34 |
| 5,166,611 | 11/1992 | Kujawa, Jr. et al. | 324/166 |
| 5,183,341 | 2/1993 | Ouchi et al. | 384/446 |
| 5,184,069 | 2/1993 | Adler et al. | 324/207.22 |
| 5,195,830 | 3/1993 | Caillault et al. | 384/448 |
| 5,200,697 | 4/1993 | Adler et al. | 324/174 |
| 5,223,760 | 6/1993 | Peck et al. | 310/168 |
| 5,227,719 | 7/1993 | Peterson et al. | 324/174 |
| 5,229,715 | 7/1993 | Niino et al. | 324/207.15 |
| 5,231,391 | 7/1993 | Rigaux | 340/448 |
| 5,250,925 | 10/1993 | Shinkle | 338/32 R |
| 5,281,911 | 1/1994 | Caron et al. | 324/174 |
| 5,293,124 | 3/1994 | Caillaut et al. | 324/173 |
| 5,309,094 | 5/1994 | Rigaux et al. | 324/174 |
| 5,385,410 | 1/1995 | Shirai et al. | 324/174 X |
| 5,434,503 | 7/1995 | Rigaux et al. | 324/174 |

FOREIGN PATENT DOCUMENTS

| | | | |
|---|---|---|---|
| 57956 | 5/1981 | Japan | 324/174 |

*Primary Examiner*—Gerard R. Strecker
*Attorney, Agent, or Firm*—Michael, Best & Friedrich

[57] ABSTRACT

A bearing assembly for a vehicle including a fixed element, a rotating element rotating relative to the fixed element about an axis, and an annular sensor connected to one of the fixed element and the rotating element. The sensor includes a pick-up coil and an annular magnet connected to the pick-up coil. The magnet has a plurality of magnetic regions which alternate in polarity around the magnet. The magnet generates a magnetic flux path magnetically coupling the magnet to the coil and resulting in the generation of an electrical signal in the coil. The rotating bearing element includes a plurality of gear teeth. The gear teeth generate a change in the reluctance of the magnetic flux path to vary the electrical signal in response to the angular speed of the fixed element relative to the rotating element.

19 Claims, 5 Drawing Sheets

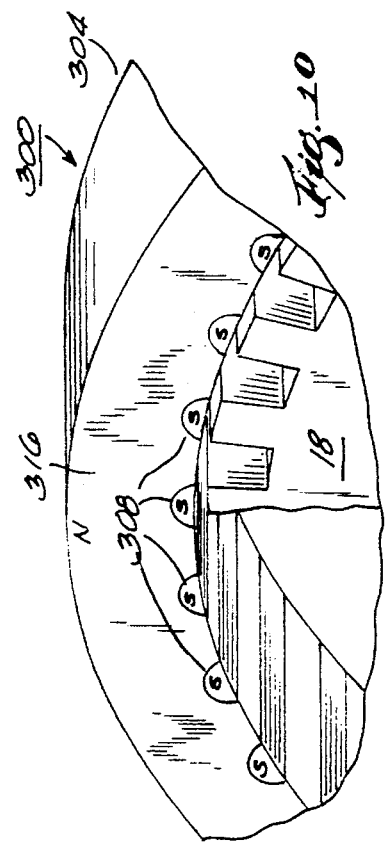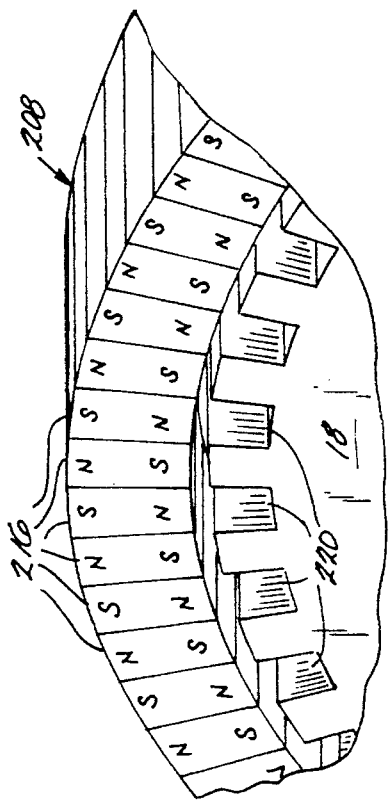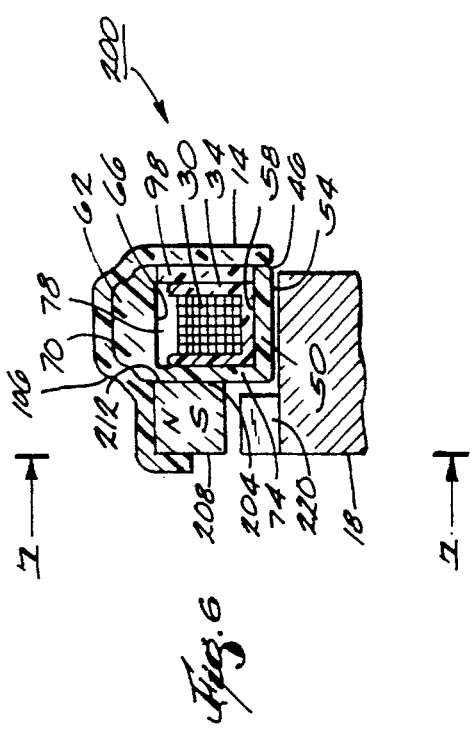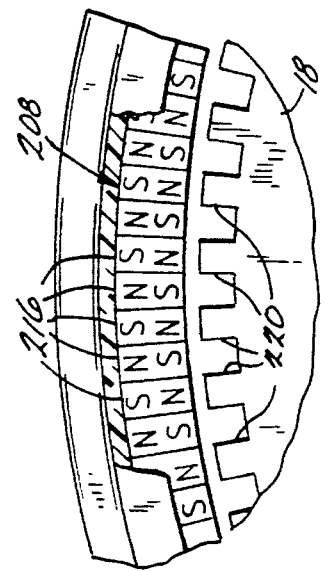

5,574,361

SWITCHED RELUCTANCE ANGULAR VELOCITY SENSOR

BACKGROUND OF THE INVENTION

The invention relates to a speed sensor for detecting the angular velocity of a rotating element and particularly to switched reluctance speed sensors, It is known in the art to provide a speed sensor to detect the angular velocity of rotating elements in the bearing assembly or transmission of a vehicle such as a truck or an automobile. In the case of a wheel speed sensor, the sensor is mounted in each bearing assembly of the vehicle. Referring specifically to a wheel speed sensor, the bearing assemblies typically include an inner bearing race and an outer bearing race. The bearing races rotate relative to one another and the speed sensor is mounted within the bearing assembly to measure the angular or rotational speed of the rotating element of the bearing assembly relative to the fixed element. Various types of wheel speed sensors are known in the art.

In one form, the sensor includes a coil and a magnet mounted on one of the bearing races and a tone wheel mounted on the other of the bearing races. The magnet generates a flux path between the bearing races and the movement of the tone wheel relative to the coil and magnet assembly varies the reluctance of the generated flux path. The variation in reluctance causes a variation in the electrical signal generated at the coil output. In this manner, an electrical signal is created at the output of the coil which is indicative of the angular or rotational speed of the one bearing element relative to the other bearing element. This type of sensor is called a variable reluctance sensor and the vector of the magnetic flux produced by the sensor is always the same.

In another form of sensor however, a magnet having alternating regions of magnetic poles is provided to change the direction of the vector of the flux path. This type of sensor is called a switched reluctance sensor. In known switched reluctance sensors, the magnet is positioned on one of the bearing races and the coil is positioned on the other of the bearing races so that the coil and the magnet rotate relative to one another. The amplitude of the electrical signal generated at the output of the coil is directly related to the distance between the coil and the magnet as well as to the flux strength of the magnet. As shown in U.S. Pat. No. 5,004,358, it is known to position the coil within a ring having a plurality of teeth extending toward the magnet to magnetically couple the magnet to the coil by creating a flux path around the coil. However, this construction necessarily consumes space within the bearing assembly, requires the use of a strong and expensive magnet and requires expensive tooling to produce the ring and teeth.

SUMMARY OF THE INVENTION

Therefore, it is an advantage to provide a switched reluctance wheel speed sensor in which the magnet is mounted with the coil on the same bearing race to reduce the amount of space required by the sensor, to reduce the need for an expensive high strength magnet and to reduce the overall cost and complexity of the sensor.

Accordingly, the invention provides a bearing assembly for a vehicle such as a truck or an automobile. The bearing assembly includes a fixed element having an outer bearing race and a rotating element having a inner bearing race. The rotating element rotates relative to the fixed element about an axis. The bearing includes a sensor for detecting the angular speed of the rotating element relative to the fixed element. The sensor is mounted in the bearing assembly and is connected to the fixed element. The sensor includes an annular ferromagnetic ring or can having a generally U-shaped cross-section. The ferromagnetic ring defines a first annular recess in the ring and a pick-up coil is mounted in the first annular recess. An annular magnet is mounted on the ferromagnetic ring adjacent the pick-up coil. The magnet includes a plurality of magnetic regions alternating in polarity around the magnet and these regions generate a plurality of magnetic flux paths extending around the coil.

Means are provided for generating a change in the reluctance of the magnetic flux path. The means provided include a plurality of ferromagnetic teeth connected to the rotating element. The teeth are mounted on the rotating element adjacent to the annular magnet. As the rotating element rotates relative to the fixed element, the ferromagnetic teeth move relative to the magnetic regions on the annular magnet so that each tooth is first aligned with the magnetic regions on the magnet having a first polarity, and then, as the rotating element rotates relative to the fixed element, each tooth is next aligned with the magnetic regions on the magnet having an opposite polarity and so on. By providing a magnet that has twice the number of magnetic regions alternating in polarity about the magnet as there are teeth on the rotating element, a sensor is provided in which all of the teeth on the rotating element are alignable (at a given moment in time) with magnetic regions on the magnet having the same polarity.

A principal feature of the invention is the provision of a switched reluctance wheel speed sensor for a bearing assembly, which sensor is designed to fit within a relatively small envelope of space within the bearing assembly.

Another feature of the invention is the provision of a switched reluctance wheel speed sensor wherein the coil and magnet are fixed relative to one another on the same bearing race.

Another feature of the invention is the provision of a sensor that operates effectively with a lower cost, lower strength magnet.

Other features and advantages of the invention will become apparent to those skilled in the art upon review of the following detailed description, claims, and drawings.

DESCRIPTION OF THE DRAWINGS

FIG. 6 is a cross-sectional view of a switched reluctance wheel speed sensor that is an alternative embodiment of the invention.

FIG. 7 is a view taken along line 7—7 in FIG. 6.

FIG. 8 is an enlarged partial perspective view of the sensor shown in FIG. 6, illustrating the magnet and the rotating bearing element which rotates within the magnet.

FIG. 10 is a view similar to FIG. 8 showing an alternative embodiment of the magnet.

Figure 1:
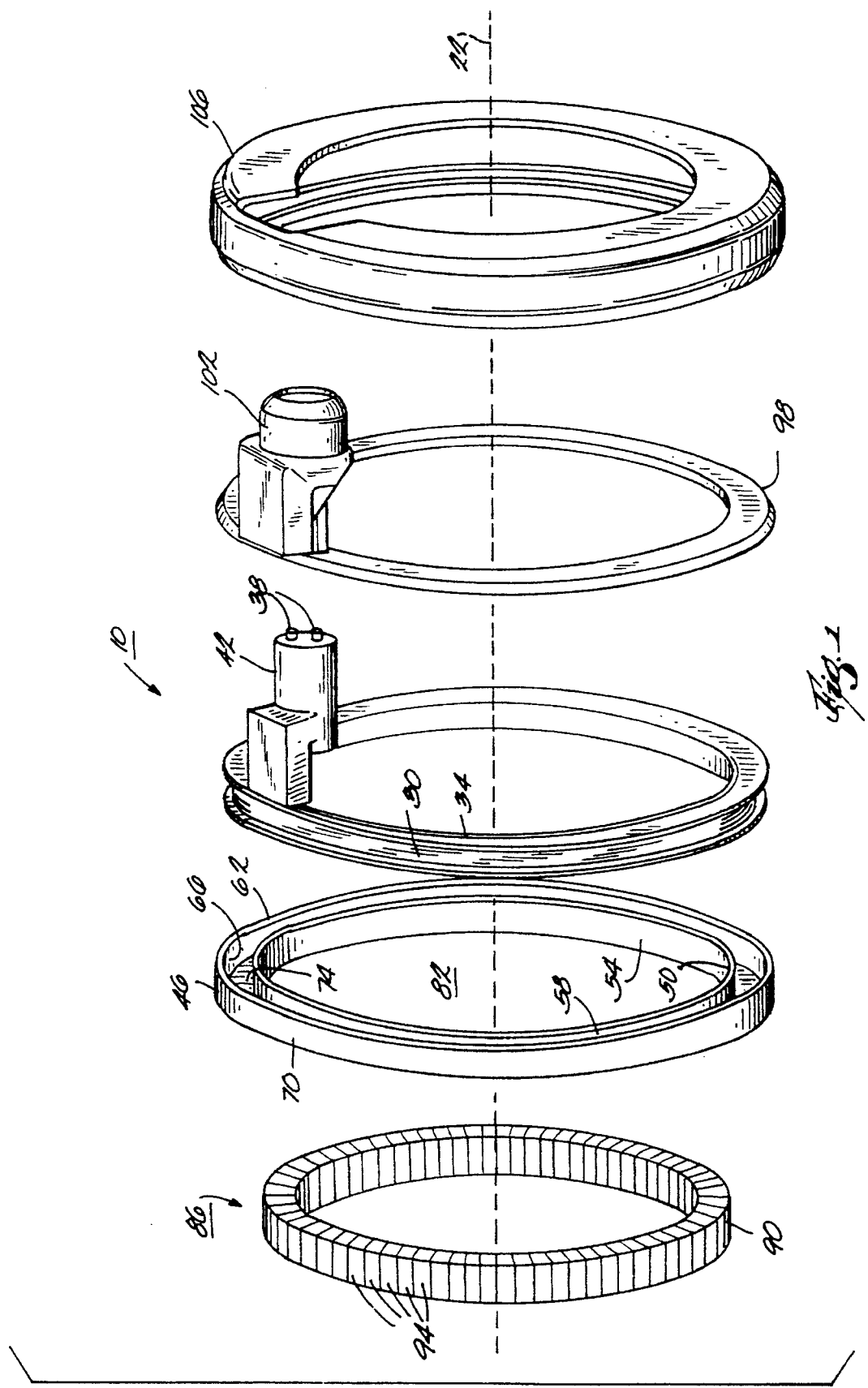
FIG. 1 is an exploded perspective view of the switched reluctance speed sensor of the invention.

Before one embodiment of the invention is explained in detail, it is understood that the invention is not limited in its application to the details of construction and the arrangements of the components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DESCRIPTION OF THE PREFERRED EMBODIMENTS

Figure 2:
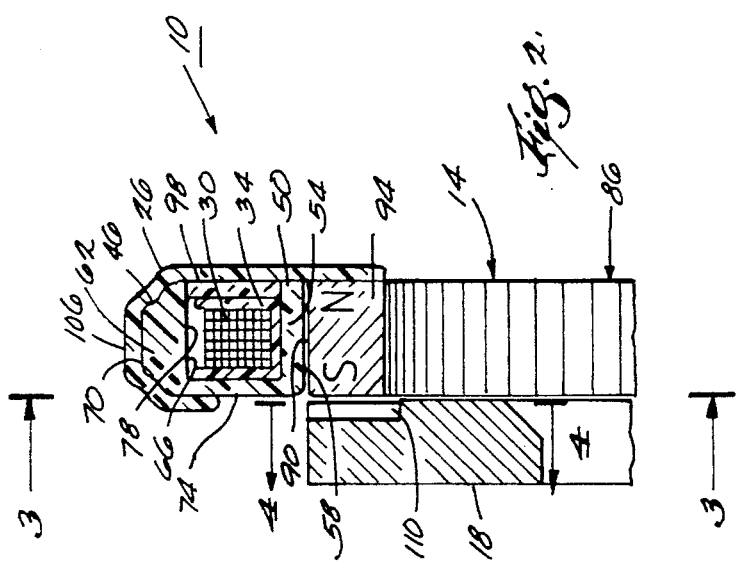
FIG. 2 is a cross-sectional view of the sensor showing the rotating wheel bearing races.

Shown in FIG. 2 of the drawings is a switched reluctance wheel speed sensor 10 embodying the invention. The sensor 10 is typically mounted within the wheel end housing or bearing assembly of an automobile. The wheel end housing or bearing assembly includes a fixed bearing race 14 and a rotating bearing race 18 mounted for rotation relative to the fixed bearing race 14 about an axis 22 (FIG. 1).

As shown in FIG. 2, the speed sensor 10 includes a sensor portion 26 mounted on the fixed bearing race 14. Referring generally to FIGS. 1 and 2, the sensor portion 26 includes an inductor or pick-up coil 30 wound onto a generally plastic bobbin 34. As is known in the art, the pick-up coil 30 is an insulated wire conductor of a selected gauge that is wound around the bobbin 34 a precise number of times to form an inductor having the desired characteristics of the sensor 10. The gauge of the wire and the number of windings may vary depending upon the particular application. The winding is terminated at each end (not shown) with a terminal 38 (FIG. 1). The terminals 38 are housed within a connector 42 (FIG. 1) mounted on the bobbin 34.

The sensor 10 also includes an annular plastic housing 46. The annular housing 46 includes a radial inner wall 50 having inner and outer surfaces 54 and 58, a radial outer wall 62 having inner and outer surfaces 66 and 70, and a connecting wall 74 extending between the radial inner wall 50 and the radial outer wall 62. The connecting wall 74, inner wall 50 and outer wall 62 together form an annular recess 78 having a U-shaped cross-section. As shown in the drawings, the bobbin 34 and coil 30, are mounted in the recess 78. Still referring to FIG. 2, the inner surface 54 of radial inner wall 50 defines a central opening 82 (FIG. 1).

Figure 3:
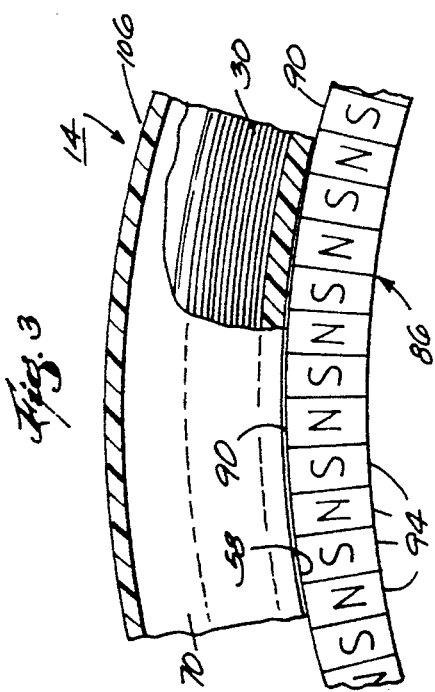
FIG. 3 is a partial view with portions cut-away taken along line 3—3 of FIG. 2.
Figure 5:
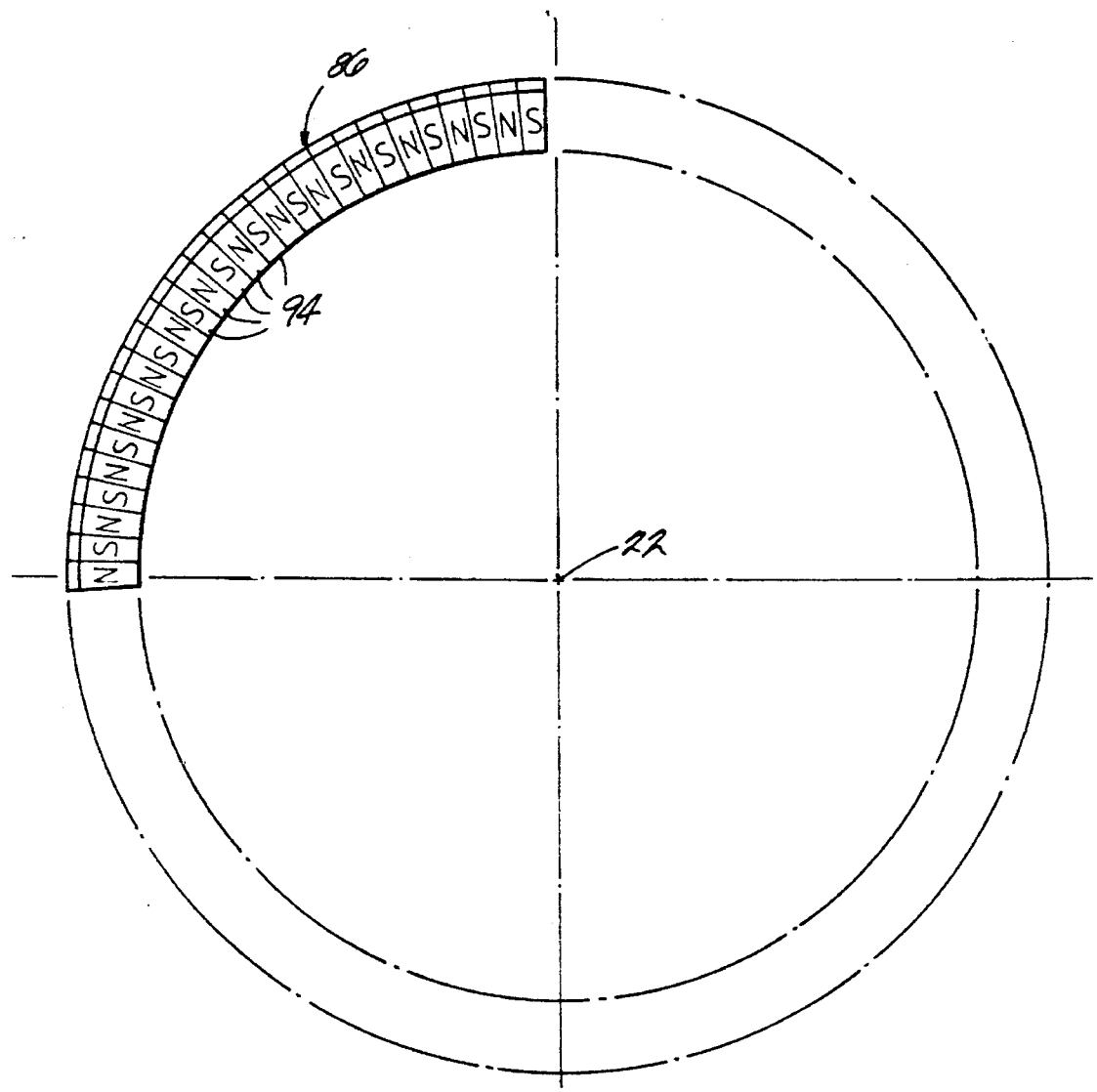
FIG. 5 is an elevational view of the magnet of the sensor showing the alternating regions of magnetic polarity in the magnet.

The sensor 10 also includes an annular magnet 86 having a plurality of magnetic regions 94 (FIGS. 1, 3, and 5). As shown in FIG. 2, the magnetic regions 94 on magnet 86 have axially aligned poles ("N" and "S"). The magnetic regions 94 alternate in polarity around the magnet 86 (FIGS. 2 and 3). Still referring to FIG. 2, the magnet 86 includes a radial outer surface 90 and is mounted in the central opening 82 of housing 46 so that the radial outer surface 90 of the magnet 86 engages the inner surface 54 of the radial inner wall 50 of the housing 46. The magnet 86 is at least partially secured within the central opening 82 by frictional engagement between the inner surface 54 and the outer surface 90 of the magnet 86.

As shown in FIGS. 1 and 2, the sensor 10 also includes an annular plate or ring 98 mounted on the housing 46 to enclose the recess 78. The annular ring 98 includes a connector housing 102 mounted on the ring 98. The connector housing 102 surrounds and encloses the connector 42 to protect the connector 42 and terminals 38 from corrosive elements such as brake dust, road dust, bearing lubricant, moisture, etc.

The sensor 10 also includes an annular ring 106 of ferromagnetic material. The annular ring 106 secures the ring 98 to the annular housing 46 and fixes the axial position of the magnet 86 with respect to the race 14. The ferromagnetic ring 106 also provides a low reluctance flux path from one pole of a given magnetic region of the magnet 86 around the coil 30 to the opposite pole of the given magnetic region of the magnet 86.

Figure 4:
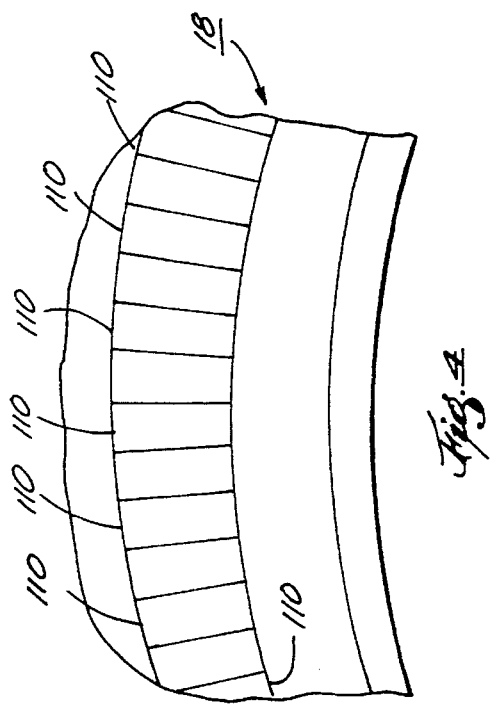
FIG. 4 is a partial view taken along line 4—4 of FIG. 2.

Illustrated in FIGS. 2 and 4 of the drawings, the rotating race 18 of the bearing assembly or wheel end housing includes a plurality of gear teeth or flinger teeth 110 arranged to rotate relative to the speed sensor 10 and to face the alternating regions 94 of magnetic polarity of the magnet 86. In the embodiment illustrated in FIGS. 2 and 4, the flinger teeth 110 are axially offset from the alternating regions 94 of magnetic polarity on the magnet 86. Thus, the embodiment illustrated in FIGS. 2 through 4 is called an "axial read" sensor. There are exactly half as many flinger teeth 110 as there are alternating regions 94 of magnetic polarity. Thus, at any given moment, all of the flinger teeth 110 will be in the process of aligning with or will be aligned with magnetic regions 94 having the same polarity.

In operation, as the flinger teeth 110 on the rotating bearing race 18 rotate past the alternating regions 94 of magnetic polarity, the passage of each tooth over a given magnetic region generates a change in the reluctance of the magnetic flux path specific to that magnetic region so as to vary the electrical signal generated on the coil 30. The frequency of the variation in the electrical signal is directly related to the angular speed of the rotating bearing element relative to the fixed bearing element.

FIG. 6 illustrates a sensor 200 that is another embodiment of the invention. The sensor 200 differs from the sensor 10 in that the sensor 200 is a "radial read" sensor. Like parts will be described using like reference numerals.

Figure 9:
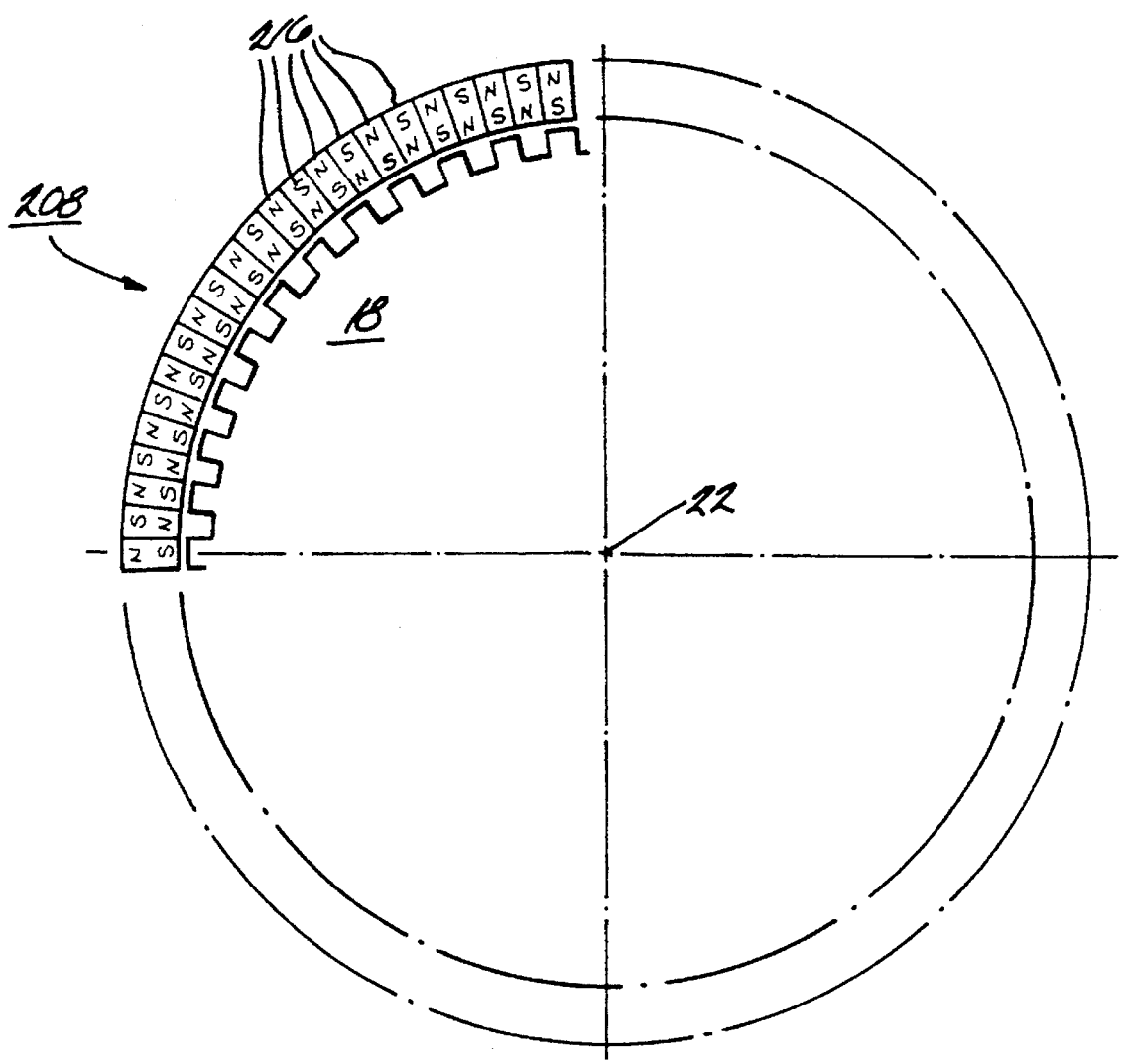
FIG. 9 is an elevational view of the magnet and the rotating bearing element of the wheel speed sensor shown in FIG. 6 and illustrating a portion of the regions of alternating magnetic polarity.

As shown in FIG. 6, the connecting wall 74 of the housing 46 includes an engaging surface 204. Sensor 200 includes an annular magnet 208 having an engaging surface 212. The magnet 208 includes radially aligned alternating regions 216 of magnetic polarity and each magnetic region 216 includes magnetic poles ("N" and "S") that are radially aligned with respect to the axis 22 (i.e., are perpendicular to the axis 22 (see FIG. 9)) of the rotating bearing race 18. The magnet 208 is mounted on the housing 46 so that engaging surfaces 204 and 208 engage one another and so that the magnet 208 is secured to the housing 46 by the ferromagnetic ring 106. As with the embodiment shown in FIGS. 1–5, the ferromagnetic ring 106 also provides a low reluctance flux path from one pole of a given magnetic region 216 of the magnet 208 around the coil 30 to the opposite pole of the given magnetic region 216 of the magnet 208.

The rotating bearing race 18 of the sensor 200 includes a plurality of gear teeth or flinger teeth 220 extending radially outward from the rotating bearing race 18. There are exactly half as many flinger teeth 220 as there are alternating regions 216 of magnetic polarity. Thus, at any given moment, all of the flinger teeth 220 will be in the process of aligning with or will be aligned with magnetic regions 216 having the same polarity.

In operation, as the flinger teeth 220 on the rotating bearing race 18 rotate past a given region 216 of magnetic polarity on the magnet 208, the teeth 220 generate a change in the reluctance of the magnetic path. This change in reluctance results in a variation in the electrical signal generated on the coil 30 and the frequency of the variation in the electrical signal is directly related to the rotational speed of the rotating bearing race 18. Like the embodiment of FIG. 2, there are half as many flinger teeth as there are magnetic regions 216 so that, at any given moment, all of the flinger teeth will be in the process of aligning with or will be aligned with magnetic regions 216 having the same polarity.

FIG. 10 illustrates another form of a magnet 300 for use in the sensors 10 and 200 described above. As shown in FIG. 10 the magnet 300 is formed from a substrate 304 having a first magnetic polarity. The magnet 300 includes doped or implanted regions 308 having a magnetic polarity that is opposite from the magnetic polarity of the substrate 304. In the magnet 300 shown in FIG. 10, the implanted regions 308 are on the radial inner surface 312 of the magnet 300 and this magnet is used in a sensor such as the "radial read" sensor 200. However, placement of the implanted regions on the axial face 316 of the magnet 300 would result in a magnet suitable for use in a sensor such as the "axial read" sensor 10.

Various features of the invention are set forth in the following claims.

We claim:

1. A sensor for detecting the angular speed of a rotating element relative to a fixed element, the rotating element having a plurality of teeth and an axis of rotation, the sensor comprising:

an annular ferromagnetic ring having an annular recess, said ring being mounted on the fixed element;

a pick-up coil mounted in said annular recess; and an annular magnet mounted in said ferromagnetic ring so as to be concentric and with radially inward relative to said pick-up coil, said magnet including a plurality of magnetic regions alternating in polarity around said magnet and said magnet being oriented relative to the plurality of teeth such that at least one of said magnetic regions is adapted to face a respective one of the teeth on the rotating element.

2. A sensor as set forth in claim 1 wherein said ferromagnetic ring has a first, generally disk-shaped portion having a radially inner edge relative to the axis, a radially outer edge relative to the axis and a supporting surface between said inner edge and said outer edge.

3. A sensor as set forth in claim 1 wherein said magnet has twice as many magnetic regions as the rotating element has teeth.

4. A sensor a set forth in claim 1 and further comprising an annular housing for mounting said magnet and said coil in said ferromagnetic ring.

5. A sensor as set forth in claim 1 wherein every other of said magnetic regions is adapted to be aligned with a respective one of the teeth on the rotating element.

6. A sensor as set forth in claim 1 wherein said magnetic regions have axially aligned poles.

7. A sensor as set forth in claim 1 wherein said magnetic regions have radially aligned poles.

8. A bearing assembly for a vehicle, said bearing assembly comprising:

a fixed element;

a rotating element rotating relative to said fixed element about an axis;

a plurality of ferromagnetic teeth mounted on one of said fixed element and said rotating element; and a sensor mounted on the other of said fixed element and said rotating element, said sensor detecting the angular speed of said rotating element relative to said fixed element, said sensor including an annular ferromagnetic ring having an annular recess, a pick-up coil mounted in said annular recess, and an annular magnet mounted on said ferromagnetic ring concentric with and radially inward relative to said pick-up coil, said magnet including a plurality of magnetic regions alternating in polarity around said magnet and said magnet being oriented relative to said other of said fixed element and said rotating element such that at least one of said magnetic regions faces a respective one of said teeth.

9. A bearing assembly as set forth in claim 8 wherein said ferromagnetic ring has a first, generally disk-shaped portion having a radially inner edge relative to the axis, a radially outer edge relative to the axis and a supporting surface between said inner edge and said outer edge.

10. A bearing assembly as set forth in claim 8 wherein said magnet has twice as many magnetic regions as said teeth.

11. A bearing assembly as set forth in claim 8 and further comprising connecting means for mounting said magnet and said pick-up coil in said ferromagnetic ring.

12. A bearing assembly as set forth in claim 8 wherein every other of said magnetic regions is alignable with a respective one of said teeth.

13. A sensor as set forth in claim 8 wherein said magnetic regions have axially aligned poles.

14. A sensor as set forth in claim 8 wherein said magnetic regions have radially aligned poles.

15. A bearing assembly as set forth in claim 8 wherein said rotating element defines an inner bearing race and said fixed element defines an outer bearing race and wherein said teeth are mounted on said inner bearing race and said sensor is mounted on said outer bearing race.

16. A bearing assembly for a vehicle, said bearing assembly comprising:

a fixed element;

a rotating element rotating relative to said fixed element about an axis;

an annular sensor connected to one of said fixed element and said rotating element, the sensor including a housing, pick-up coil mounted in said housing and an annular magnet mounted in said housing to be concentric with and radially inward relative to said coil, said magnet including a plurality of magnetic regions alternating in polarity around said magnet and said magnet generating a magnetic flux path magnetically coupling said magnet to said coil to generate an electrical signal in said coil; and means for generating a change in the reluctance of said magnetic flux path to vary said electrical signal in response to the angular speed of said fixed element relative to said rotating element, said means being mounted on the other of said fixed element and said rotating element.

17. A bearing assembly as set forth in claim 16 wherein said means for generating a change in the reluctance of said magnetic flux path includes a plurality of teeth on the other of said fixed element and said rotating element.

18. A bearing assembly as set forth in claim 17 wherein said magnetic regions have axially aligned poles and said teeth are axially offset from said magnet.

19. A bearing assembly as set forth in claim 17 wherein said magnetic regions have radially aligned poles and said teeth are radially offset from said magnet.

\* \* \* \* \*

UNITED STATES PATENT AND TRADEMARK OFFICE
CERTIFICATE OF CORRECTION

PATENT NO. : 5,574,361
DATED : Nov. 12, 1996
INVENTOR(S) : Seefeldt et al.

It is certified that error appears in the above-indentified patent and that said Letters Patent is hereby corrected as shown below:

ON THE TITLE PAGE:

Under Foreign Patent Documents please insert:

```
-- 0 693 689 A1   1/1996   Europe...........G01P 1/00 --
-- 2 251 694 A    1/1992   Great Britain....G01P 3/487 --
-- 0 474 064 A1   8/1991   Europe...........G01P 3/488 --
-- 0 557 931 A1   2/1993   Europe...........G01P 3/44 --
```

Claim 1, column 5, line 35, "and with" should be -- with and --

Claim 16, column 6, line 42, before "pick-up" insert -- a --

Signed and Sealed this

Eighteenth Day of March, 1997

*Attest:*

BRUCE LEHMAN

*Attesting Officer*     *Commissioner of Patents and Trademarks*